US012009752B2

(12) United States Patent
De Guzman et al.

(10) Patent No.: US 12,009,752 B2
(45) Date of Patent: Jun. 11, 2024

(54) CONVERTER AND CONVERTING METHOD THEREOF

(71) Applicant: Lite-On Singapore Pte Ltd, Singapore (SG)

(72) Inventors: Joey De Guzman, Singapore (SG); Jon Karlo Lee, Singapore (SG)

(73) Assignee: Lite-On Singapore Pte Ltd, Singapore (SG)

( * ) Notice: Subject to any disclaimer, the term of this patent is extended or adjusted under 35 U.S.C. 154(b) by 229 days.

(21) Appl. No.: 17/748,052

(22) Filed: May 19, 2022

(65) Prior Publication Data

US 2023/0378876 A1 Nov. 23, 2023

(51) Int. Cl.
*H02M 3/335* (2006.01)
*H02M 1/00* (2006.01)

(52) U.S. Cl.
CPC ..... *H02M 3/33569* (2013.01); *H02M 1/0009* (2021.05)

(58) Field of Classification Search
CPC ......... H02M 3/33569; H02M 3/33571; H02M 3/33573; H02M 3/33576; H02M 3/33584; H02M 3/33592; H02M 3/3376; H02M 3/33546; H02M 3/335
See application file for complete search history.

(56) References Cited

U.S. PATENT DOCUMENTS

| 8,472,212 | B2 | 6/2013 | Li et al. |
| 2017/0063224 | A1 | 3/2017 | Min et al. |
| 2017/0324336 | A1* | 11/2017 | Suetomi ............ H02M 3/33584 |
| 2018/0019679 | A1 | 1/2018 | Yang et al. |
| 2018/0183345 | A1 | 6/2018 | Itoh et al. |
| 2021/0028712 | A1* | 1/2021 | Yu .......................... H01F 30/16 |

FOREIGN PATENT DOCUMENTS

| CN | 107634654 | 8/2019 |
| TW | M255584 | 1/2005 |

OTHER PUBLICATIONS

"Office Action of Taiwan Counterpart Application", issued on Aug. 17, 2023, p. 1-p. 5.

* cited by examiner

*Primary Examiner* — Nguyen Tran
(74) *Attorney, Agent, or Firm* — JCIPRNET

(57) ABSTRACT

A converter includes a transformer, a first switching circuit, a second switching circuit and a controller. The first switching circuit is coupled to a first side of the transformer, and is controlled by a first driving signal to transfer power to the transformer during a first enabling period. The second switching circuit is coupled to a secondary side of the transformer, and is controlled by a second driving signal to transfer power received from the transformer. The controller is configured to provide the first driving signal to the first switching circuit, to provide the second driving signal to the second switching circuit, generate the second driving signal according to the first driving signal of a same driving period, and enable a second enabling period of the second driving signal during the same driving period.

8 Claims, 6 Drawing Sheets

CONVERTER AND CONVERTING METHOD THEREOF

BACKGROUND

Technical Field

The disclosure relates to a power conversion, and more particularly to a converter and a converting method thereof that are capable of quickly and accurately driving a switching circuit of the converter.

Description of Related Art

A converter is widely used in many electronic devices such as electric vehicles, energy storage systems, mobile phones, computers and the like. The converter may include a primary side and a secondary side, in which a switching circuit in each of the primary side and the secondary side is driven by a driving signal. However, a generation of the driving signal for driving the switching circuit on the secondary side is delayed by at least one switching cycle from an enablement of the driving signal for driving the switching circuit on the primary side, especially when the converter operates at a switching frequency lower than a resonant frequency of the converter. In addition, a false detection of the current flowing through the secondary side usually occurs when the converter operates at the switching frequency lower than the resonant frequency of the converter. The delay in generation of the driving signal and the false enablement of the switching circuit in the secondary side may both result in unreliable performance of the converter.

SUMMARY

The disclosure introduces a converter and a converting method thereof that are capable of quickly and accurately driving a switching circuit of the converter.

In some embodiments, the converter includes a transformer, a first switching circuit, a second switching circuit and a controller. The transformer has a first side and a second side. The first switching circuit is coupled to the first side of the transformer, and is controlled by a first driving signal to transfer power to the transformer during a first enabling period. The second switching circuit is coupled to the second side of the transformer, and is controlled by a second driving signal to transfer power received from the transformer. The controller is configured to provide the first driving signal to the first switching circuit, to provide the second driving signal to the second switching circuit, to generate the second driving signal according to the first driving signal of a same driving period, and to enable a second enabling period of the second driving signal during the same driving period.

In some embodiments, the converting method includes steps of providing, by a controller, a first driving signal to a first switching circuit in order to transfer power to a first side of a transformer during a first enabling period of the first driving signal; providing, by the controller, a second driving signal to a second switching circuit to transfer power received from a second side of the transformer; and generating, by the controller, the second driving signal according to the first driving signal of a same driving period, wherein a second enabling period of the second driving signal is enabled during the same driving period.

DESCRIPTION OF THE EMBODIMENTS

Figure 1:
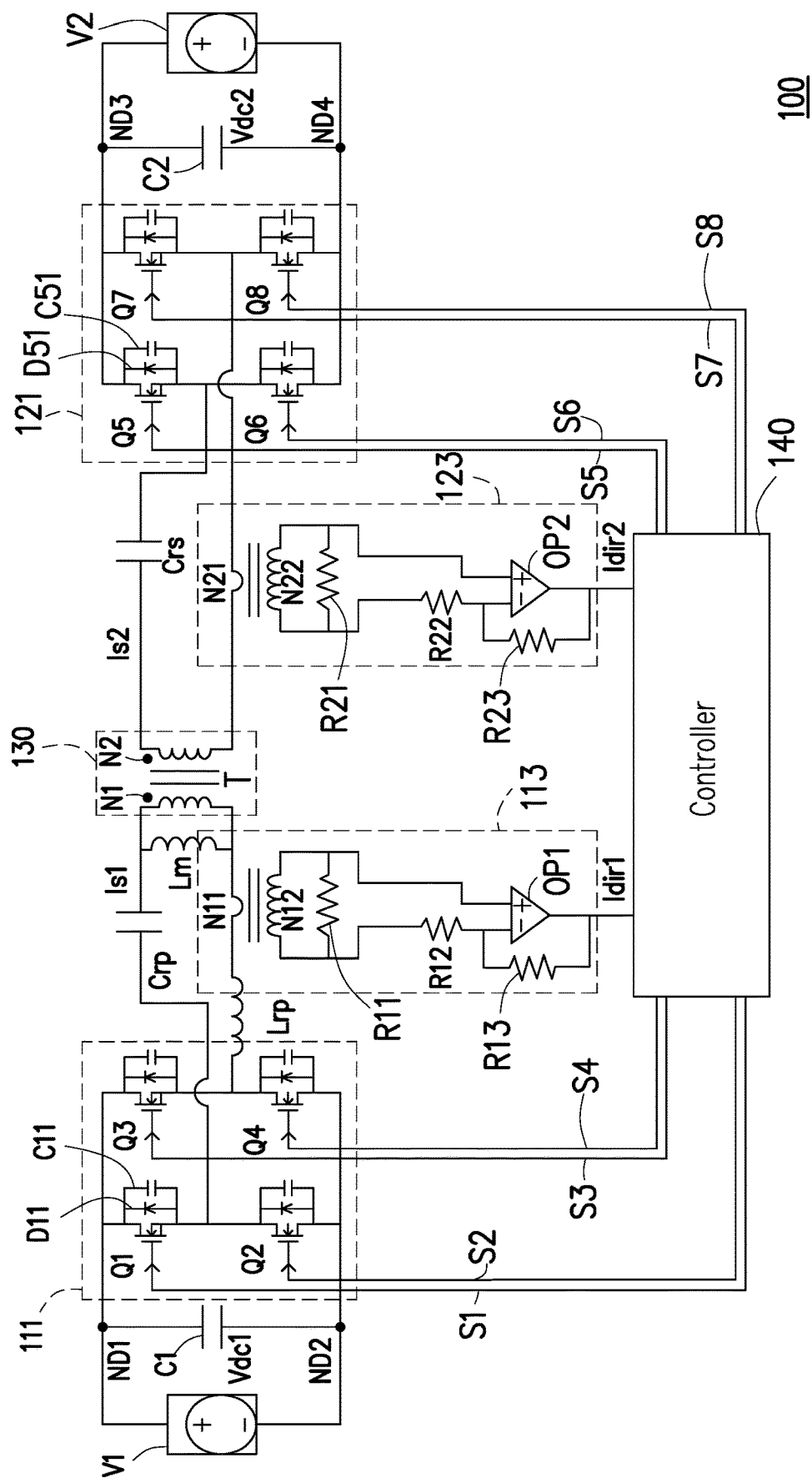
FIG. 1 is a schematic diagram illustrating a converter in accordance with some embodiments.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic diagram of a converter 100 in accordance with some embodiments. The converter 100 may include a first switching circuit 111, a first sensing circuit 113, a second switching circuit 121, a second sensing circuit 123, a transformer 130 and a controller 140.

The transformer 130 may include windings N1 and N2. Winding N1 is coupled to a first side of the transformer 130. Winding N2 is coupled to a second side of the transformer 130. One of the first side and the second side of the transformer 130 is referred to as a primary side of the transformer 130, and another side of the first side and the second side is referred to as a secondary side of the transformer 130. The transformer 130 is configured to transfer electric energy between the first side and the second side through the windings N1 and N2.

In some embodiments, the first switching circuit 111 may include a first switch Q1, a second switch Q2, a third switch Q3, and a fourth switch Q4, in which a first terminal of the first switch Q1 is coupled to a first terminal of the third switch Q3, and a second terminal of the first switch Q1 is coupled to a first terminal of the second switch Q2. The first terminal of the second switch Q2 is further coupled to a first terminal of the first side of the transformer 130, a second terminal of the third switch Q3 is coupled to a first terminal of the fourth switch Q4, the first terminal of the fourth switch Q4 is further coupled to a second terminal of the first side of the transformer 130, and a second terminal of the second switch Q2 is coupled to a second terminal of the fourth switch Q4. The first terminal of the first switch Q1 and the first terminal of the third switch Q3 may be coupled to a connection node ND1, and the second terminal of the second switch Q2 and the second terminal of the fourth switch Q4 may be coupled to a connection node ND2. A plurality of first driving signals S1, S2, S3 and S4 are configured to drive the first switch Q1, the second switch Q2, the third switch Q3 and the fourth switch Q4, respectively. In some embodiments, the controller 140 is configured to provide the first driving signals S1, S2, S3 and S4.

In some embodiments, the first switching circuit 111 further includes a plurality of diodes and a plurality of capacitors, in which each of the switches is coupled to one of the diodes and one of the capacitors in parallel. For example, the first switch Q1 is coupled to a diode D11 and a capacitor C11 in parallel. In other words, the first terminal of the first switch Q1 is coupled to a first terminal of the diode D11 and a first terminal of the capacitor C11, and the second terminal of the first switch Q1 is coupled to a second terminal of the diode D11 and a second terminal of the capacitor C11. In some embodiments, each of the first switch Q1, the second switch Q2, the third switch Q3 and the fourth switch Q4 are transistors.

In some embodiments, the converter 100 further includes a capacitor C1 and a voltage source V1 that are coupled between the connection node ND1 and the connection node ND2. In other words, a first terminal of the voltage source V1 and a first terminal of the capacitor C1 are coupled to the connection node ND1; and a second terminal of the voltage source V1 and a second terminal of the capacitor C1 are coupled to the connection node ND2. A voltage Vdc1 is formed between the connection nodes ND1 and ND2.

In some embodiments, the converter 100 further includes a first resonant circuit that comprises a capacitor Crp, a first inductor Lrp, and a second inductor Lm, in which a first terminal of the second inductor Lm is coupled to the capacitor Crp and a second terminal of the second inductor Lm is coupled to the first inductor Lrp. The second inductor Lm may be coupled in parallel to the winding N1 of the transformer 130, in which the first terminal of the second inductor Lm is coupled to the first terminal of the winding N1, and the second terminal of the second inductor Lm is coupled to the second terminal of the winding N1. It is noted that the first resonant circuit may include more or less elements than the elements illustrated in FIG. 1. The first resonant circuit is configured to circulate a first current Is1 flowing through the first side of the transformer 130 in accordance with a switching frequency of the switches Q1, Q2, Q3, and Q4 of the first switching circuit 111. In this way, the electric energy is transferred between the first side of the transformer 130 and the second side of the transformer 130. In some embodiments, the switching frequency of the switches Q1, Q2, Q3, and Q4 is controlled by the first driving signals S1, S2, S3 and S4 provided by the controller 140.

The first sensing circuit 113 is configured to sense the first current Is1 flowing through the first side of the transformer 130 to generate a first sensed current Idir1. The first sensing circuit 113 may include a current transformer and an operational amplifier circuit, in which the current transformer is formed by windings N11, N12 and the resistor R11, and the operational amplifier circuit is formed by resistors R12, R13 and an operational amplifier OP1. The first sensing circuit 113 is coupled to the controller 140, and is configured to send the first sensed current Idir1 to the controller 140.

In some embodiments, the second switching circuit 121 may include a fifth switch Q5, a sixth switch Q6, a seventh switch Q7, and an eighth switch Q8, in which a first terminal of the fifth switch Q5 is coupled to a first terminal of the seventh switch Q7, and a second terminal of the fifth switch Q5 is coupled to a first terminal of the sixth switch Q6. The second terminal of the fifth switch Q5 is coupled to a first terminal of the second side of the transformer 130, a second terminal of the seventh switch Q7 is coupled to a second terminal of the second side of the transformer 130, a first terminal of the eighth switch Q8 is coupled to the second terminal of the seventh switch Q7, and a second terminal of the sixth switch Q6 is coupled to a second terminal of the eighth switch Q8. The first terminal of the fifth switch Q5 and the first terminal of the seventh switch Q7 may be coupled to a connection node ND3, and the second terminal of the sixth switch Q6 and the second terminal of the eighth switch Q8 may be coupled to a connection node ND4. A plurality of second driving signals S5, S6, S7 and S8 are configured to drive the fifth switch Q5, the sixth switch Q6, the seventh switch Q7 and the eighth switch Q8, respectively. In some embodiments, the controller 140 is configured to provide the second driving signals S5, S6, S7 and S8.

In some embodiments, the second switching circuit 121 further includes a plurality of diodes and a plurality of capacitors, in which each of the switches is coupled to one of the diodes and one of the capacitors in parallel. For example, the fifth switch Q5 is coupled to a diode D51 and a capacitor C51 in parallel. In other words, the first terminal of the fifth switch Q5 is coupled to a first terminal of the diode D51 and a first terminal of the capacitor C51, and the second terminal of the fifth switch Q5 is coupled to a second terminal of the diode D51 and a second terminal of the capacitor C51. In some embodiments, each of the fifth switch Q5, the sixth switch Q6, the seventh switch Q7 and the eighth switch Q8 are transistors.

In some embodiments, the converter 100 further includes a capacitor C2 and a voltage source V2 that are coupled between the connection node ND3 and the connection node ND4. In other words, a first terminal of the voltage source V2 and a first terminal of the capacitor C2 is coupled to the connection node ND3; and a second terminal of the voltage source V2 and a second terminal of the capacitor C2 is coupled to the connection node ND4. A voltage Vdc2 is formed between the connection nodes ND3 and ND4.

In some embodiments, the converter 100 further includes a second resonant circuit that comprises a capacitor Crs, in which a first terminal of capacitor Crs is coupled to the winding N2 of the transformer 130, and a second terminal of the capacitor Crs is coupled to a connection node between the seventh switch Q7 and the eighth switch Q8. It is noted that the second resonant circuit may include more elements than the elements illustrated in FIG. 1. The second resonant circuit is configured to circulate a second current Is2 flowing through the second side of the transformer 130 in accordance with a switching frequency of the switches Q5, Q6, Q7, and Q8 of the second switching circuit 121. In this way, the electric energy is transferred between the first side of the transformer 130 and the second side of the transformer 130. In some embodiments, the switching frequency of the switches Q5, Q6, Q7, and Q8 is controlled by the second driving signals S5, S6, S7 and S8 provided by the controller 140.

In some embodiments, the second sensing circuit 123 is coupled to the transformer 130 and the controller 140. The second sensing circuit 123 is configured to sense the second current Is2 flowing through the second side of the transformer 130 to generate a second sensed current Idir2. The second sensing circuit 123 may include a current transformer and an operational amplifier circuit, in which the current transformer is formed by windings N21, N22 and the resistor R21, and the operational amplifier circuit is formed by resistors R22, R23 and an operational amplifier OP2. The second sensing circuit 123 is coupled to the controller 140, and is configured to send the second sensed current Idir2 to the controller 140.

In some embodiments, the controller 140 is coupled to the first sensing circuit 113 and the second sensing circuit 123, and is configured to generate the first driving signals S1, S2, S3, and S4 and the second driving signals S5, S6, S7 and S8. The controller 140 may further include gate driver circuits which increase the power of the first driving signals S1, S2, S3 and S4 and the second driving signals S5, S6, S7 and S8. The first driving signals S1, S2, S3, and S4 may include a first enabling period. The first switching circuit 111 may transfer power to the transformer 130 during the first enabling period. For example, during the first enabling period of the first driving signal S1, the first switch Q1 is turned on.

In some embodiments, the controller 140 generates the second driving signals S5, S6, S7 and S8 according to the first driving signals S1, S2, S3 and S4 and the second sensed current Idir2. The controller 140 may generate the second driving signals S5, S6, S7 and S8 according to the first driving signals S1, S2, S3 and S4 of a same driving period, and the controller 140 may enable a second enabling period of the second driving signals S5, S6, S7 and S8 during the same driving period. In some embodiments, the controller 140 may generate the second driving signal S5 according to the first driving signal S1 of a same driving period, and the controller 140 may enable a second enabling period of the second driving signal S5 during the same driving period.

Detailed description about the generation of the second driving signal S5 will be described later with reference to FIG. 2 to FIG. 5. The controller 140 may generate the second driving signal S5 according to the first driving signal S1. In a similar way and following the description of FIG. 2 to FIG. 5, the controller 140 may generate the second driving signal S6 according to the first driving signal S2, the controller 140 may generate the second driving signal S7 according to the first driving signal S3, and the controller 140 may generate the second driving signal S8 according to the first driving signal S4. The controller 140 may generate the first driving signals S1, S2, S3 and S4. In order to avoid a short circuit between the connection nodes ND1 and ND2, the first driving signals S1 and S2 should not be enabled at the same time, and the first driving signals S3 and S4 should not be enabled at the same time. In other words, the first enabling periods of the first driving signals S1 and S2 should not be enabled at the same time, and the first enabling periods of the first driving signals S3 and S4 should not be enabled at the same time. The first driving signals S1 and S4 may be enabled at the same time, and the first driving signals S2 and S3 may be enabled at the same time.

Figure 2:
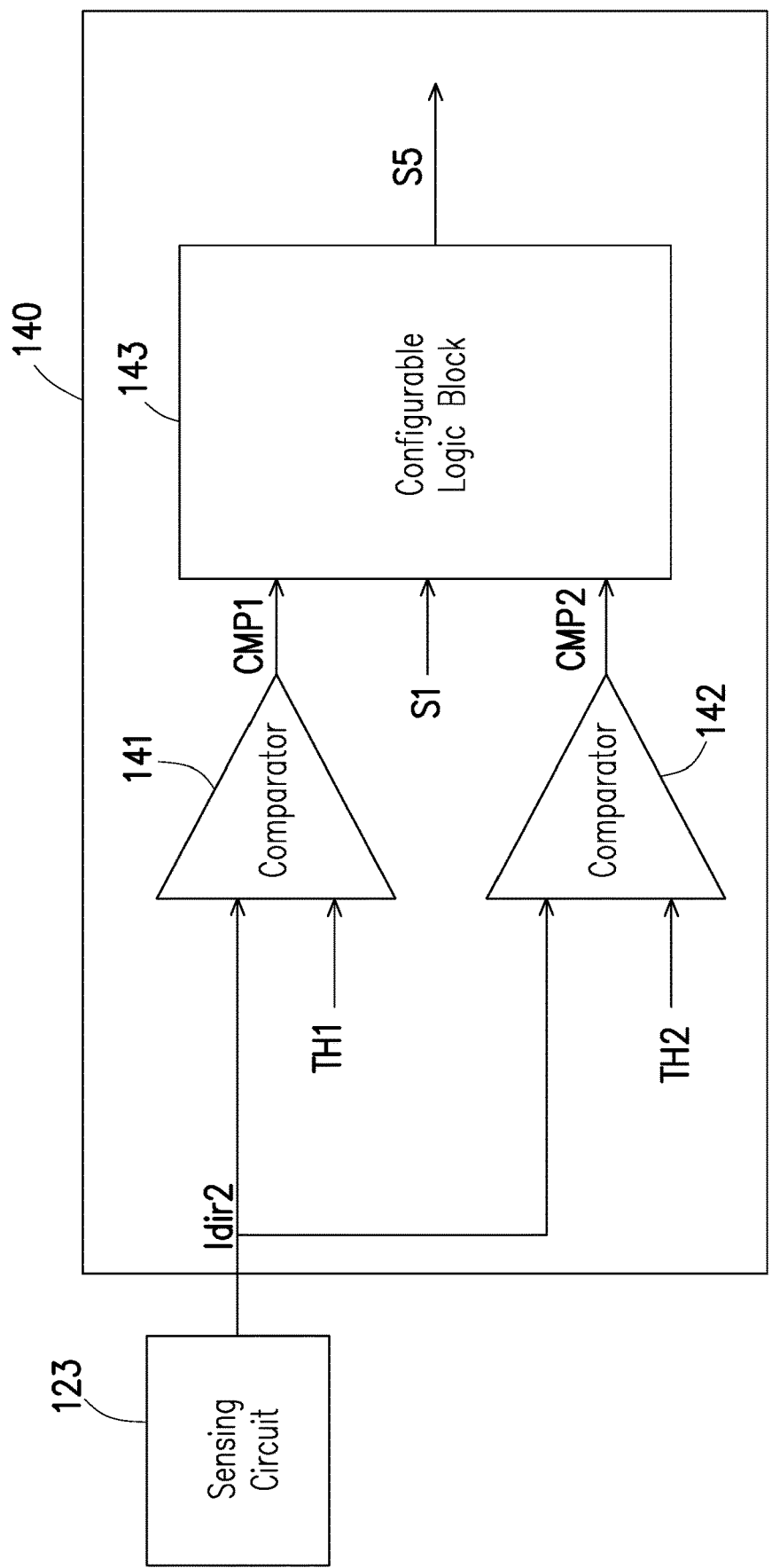
FIG. 2 is a schematic diagram illustrating a sensing circuit and a controller of a converter in accordance with some embodiments.

FIG. 2 illustrates a schematic diagram of the controller 140 and a sensing circuit 123 in accordance with some embodiments. The sensing circuit 123 may sense the second current Is2 flowing through the second side of the transformer 130 to generate a sensed current Idir2. The sensed current Idir2 may also be referred to as a sensing signal Idir2.

In some embodiments, the controller 140 includes a configurable logic block 143 and a hysteresis comparator, in which the hysteresis comparator includes a first comparator 141 and a second comparator 142. The first comparator 141 may compare the sensing signal Idir2 received from the sensing circuit 123 with a first predetermined threshold TH1 to generate a first comparison signal CMP1. The first comparator 141 may be a digital comparator that is configured to output the first comparison signal CMP1 in a form of a digital code. For example, when the sensing signal Idir2 is greater than the first predetermined threshold TH1, the first comparator 141 may generate the first comparison signal CMP1 with a first logic state; and when the sensing signal Idir2 is less than the first predetermined threshold TH1, the first comparator 141 may generate the first comparison signal CMP1 with a second logic state that is different from the first logic state.

The second comparator 142 may compare the sensing signal Idir2 with a second predetermined threshold TH2 to generate a second comparison signal CMP2. The second comparator 142 may be a digital comparator that is configured to output the second comparison signal CMP2 in a form of a digital code. For example, when the sensing signal Idir2 is greater than the second predetermined threshold TH2, the second comparator 142 may generate the second comparison signal CMP2 with the first logic state; and when the sensing signal Idir2 is less than the second predetermined threshold TH2, the second comparator 142 may generate the second comparison signal CMP2 with the second logic state.

In some embodiments, the configurable logic block 143 generates the second driving signal S5 according to the first driving signal S1, the first comparison signal CMP1 and the second comparison signal CMP2. The first driving signal S1, the first comparison signal CMP1 and the second comparison signal CMP2 are configured to enable the second driving signal S5, and to disable the second driving signal S5. In other words, the first driving signal S1, the first comparison signal CMP1 and the second comparison signal CMP2 may determine a rising time and a falling time of the second enabling period of the second driving signal S5. In some embodiments, the configurable logic block 143 enables the second enabling period of the second driving signal S5 after determining that the sensing signal Idir2 is greater than the first predetermined threshold TH1 and when the first driving signal S1 is at a predetermined logic state (e.g., high logic state). The first driving signal S1 is at the predetermined logic state during the first enabling period of the first driving signal S1. In this way, the rising time of the first enabling period of the first driving signal S1 is prior to the rising time of the second enabling period of the second driving signal S5. The configurable logic block 143 may disable the second driving signal S5 after determining that the sensing signal Idir2 is less than the second predetermined threshold TH2. The first predetermined threshold TH1 may be greater than the second predetermined threshold TH2.

Figure 3:
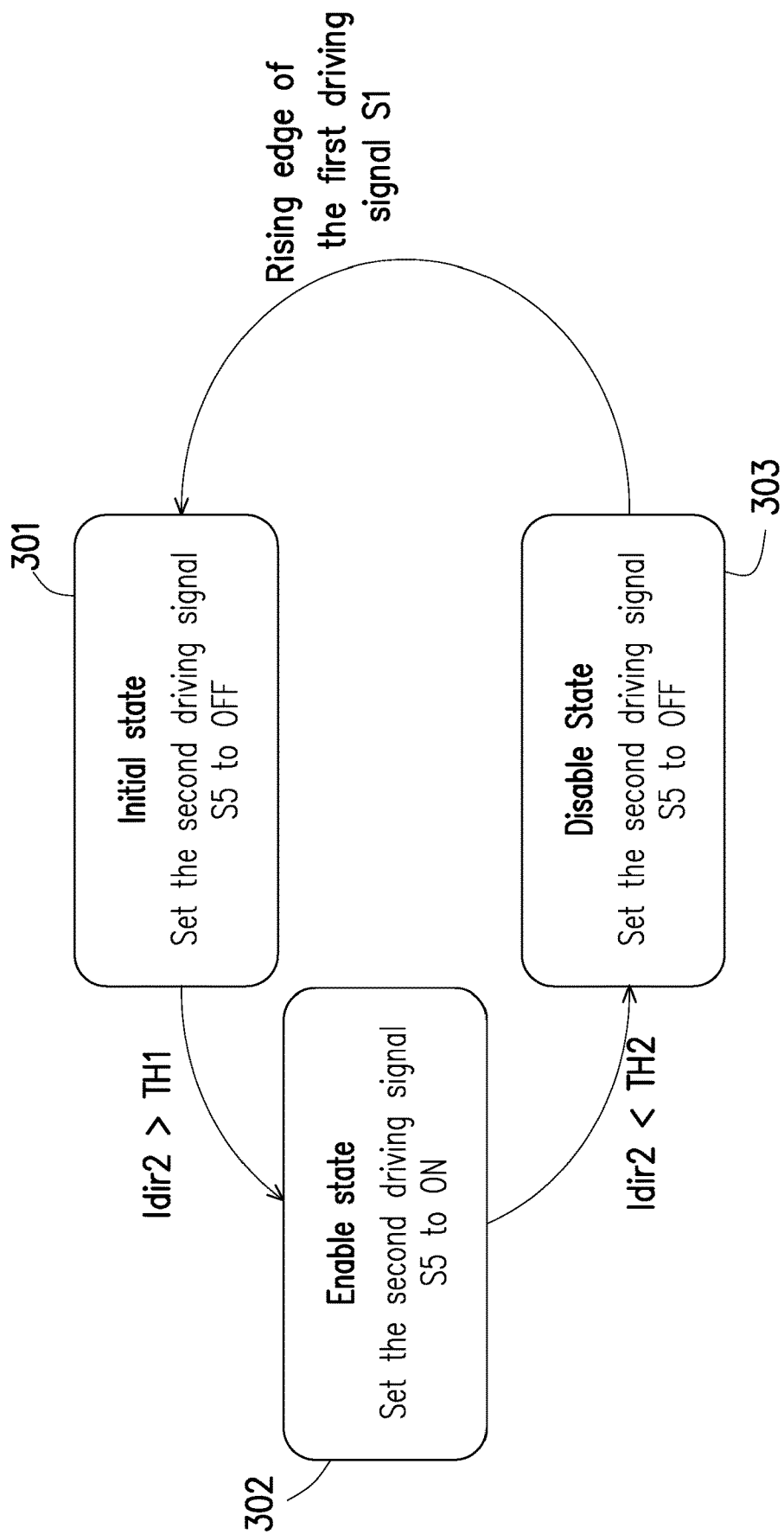
FIG. 3 is a diagram illustrating an operation of a controller in accordance with some embodiments.

FIG. 3 illustrates an operation of a controller of a converter in accordance with some embodiments. Referring to FIG. 1, FIG. 2 and FIG. 3, at an initial state (step 301), the controller 140 sets the second driving signal S5 to an OFF state at the rising edge of the first driving signal S1. In other words, the controller 140 disables the second driving signal S5 during the initial state. Setting the second driving signal S5 to an OFF state disables the second switching circuit 121 from transferring power received from the transformer. Particularly, setting the second driving signal S5 to an OFF state turns off the fifth switch Q5. When the controller 140 determines that the sensing signal Idir2 is greater than the first predetermined threshold TH1, the controller 140 changes from the initial state to an enable state (step 302).

In step 302, the controller 140 sets the second driving signal S5 to an ON state. Setting the second driving signal S5 to an ON state enables the second switching circuit 121 to transfer power received from the transformer. Particularly, setting the second driving signal S5 to an ON state turns on the fifth switch Q5. When the controller 140 determines that the sensing signal Idir2 is less than the second predetermined threshold TH2, the controller 140 changes from the enable state to a disable state (step 303).

In step 303, the controller 40 sets the second driving signal S5 to the OFF state. Similarly, setting the second driving signal S5 to an OFF state turns off the fifth switch Q5. The controller 140 changes from the disable state to the initial state at the following rising edge of the first driving signal S1 (step 301).

As shown in FIG. 3, the controller 140 only enables the second driving signal S5 for driving the fifth switch S5 after the rising edge of the first driving signal S1 and when the sensing signal Idir2 is greater than the first predetermined threshold TH1. In this way, a fault enablement of the second driving signal S5 (especially when the converter 100 operates at a switching frequency that is lower than the resonant frequency of the converter 100) is prevented, and the performance of the converter 100 is improved.

Figure 4:
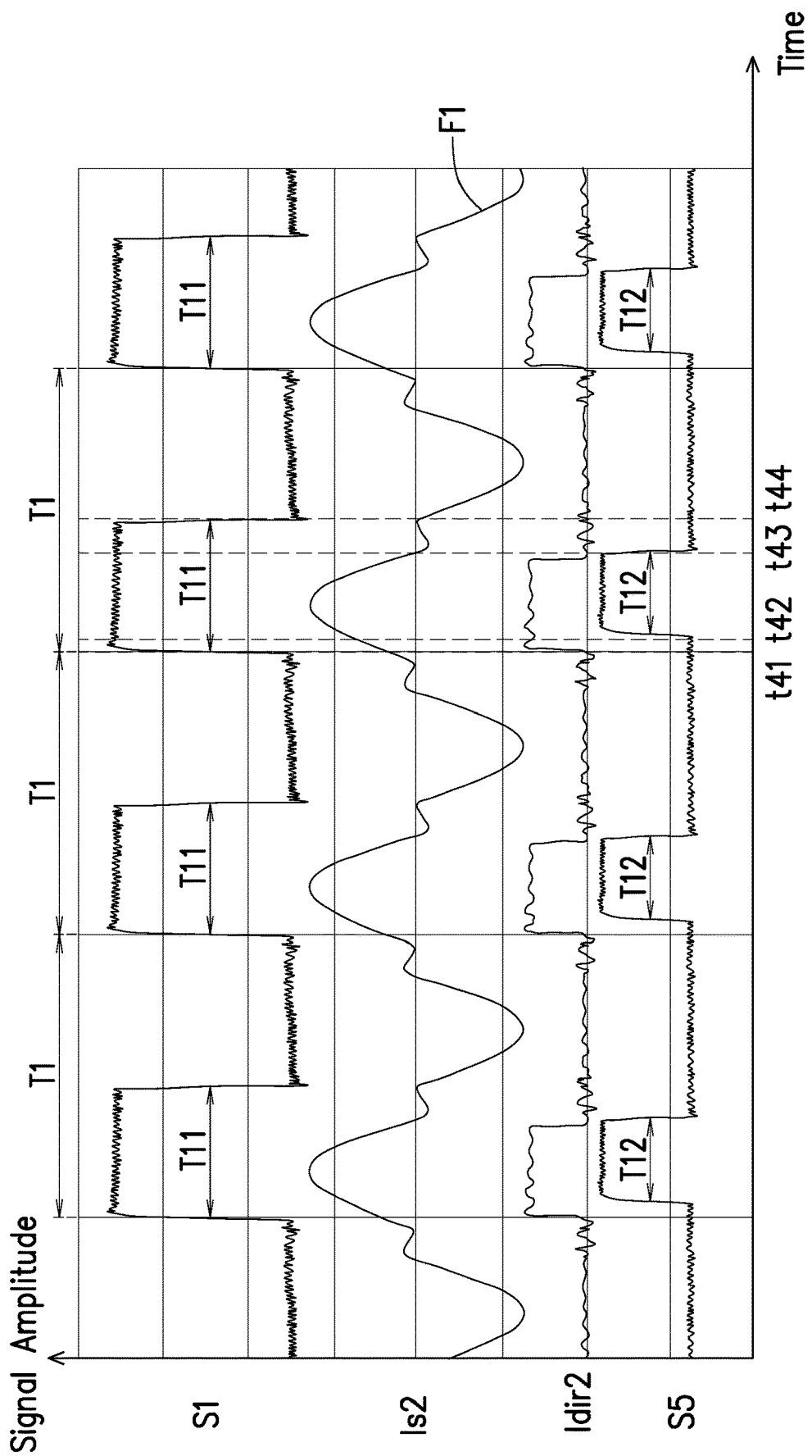
FIG. 4 is a timing diagram illustrating waveforms of signals in the converter operating at a switching frequency lower than a resonant frequency in accordance with some embodiments.

FIG. 4 is a timing diagram illustrating waveforms of the first driving signal S1, the second current Is2, the sensing signal Idir2 and the second driving signal S5 of the converter 100 operating at a switching frequency F1 that is lower than a resonant frequency of the converter 100 in accordance with some embodiments. The horizontal axis of the diagram in FIG. 4 represents time, and the vertical axis of the diagram in FIG. 4 represents a signal amplitude (i.e., voltage and/or current amplitudes). Referring to FIG. 4, the first driving signal S1 may be a signal which includes a pulse corresponding to a first enabling period T11 in each driving period T1. The second driving signal S5 may be a signal which includes a pulse corresponding to a second enabling period T12. For example, in the driving period T1, the first enabling period T11 of the first driving signal S1 is from t41 (i.e., rising time) to t44 (i.e., falling time). Enabling the first driving signal S1 results in a generation of the second current Is2 and the sensing signal Idir2 on the second side of the transformer. In some embodiments, the second driving signal S5 is generated according to the first driving signal S1 of a same driving period T1, and the second enabling period T12 of the second driving signal S5 is enabled during the same driving period T1. As such, the first enabling period T11 and the second enabling period T12 are in the same driving period T1.

The rising time of the second enabling period T12 is at t42. The falling time of the second enabling period T12 is at t43. In some embodiments, at the rising time t42 of the second enabling period T12, the sensing signal Idir2 is greater than a first predetermined threshold (i.e., the first predetermined threshold TH1 in FIG. 2) and the rising time t42 is after the rising time t41 of the first enabling period T11. Since the rising time t41 is prior to the rising time t42, a rising edge of the first driving signal S1 is prior to a rising edge of the second driving signal S5 in the same driving period T1. In some embodiments, at the falling time t43 of the second enabling period T12, the sensing signal Idir2 is less than a second predetermined threshold (i.e., the second predetermined threshold TH2 in FIG. 2). In some embodiments, the second enabling period T12 of the second driving signal S5 is enabled only once in each driving period T1. In FIG. 4, there is only one second enabling period T12 from t42 to t43 in each driving period T1.

Figure 5:
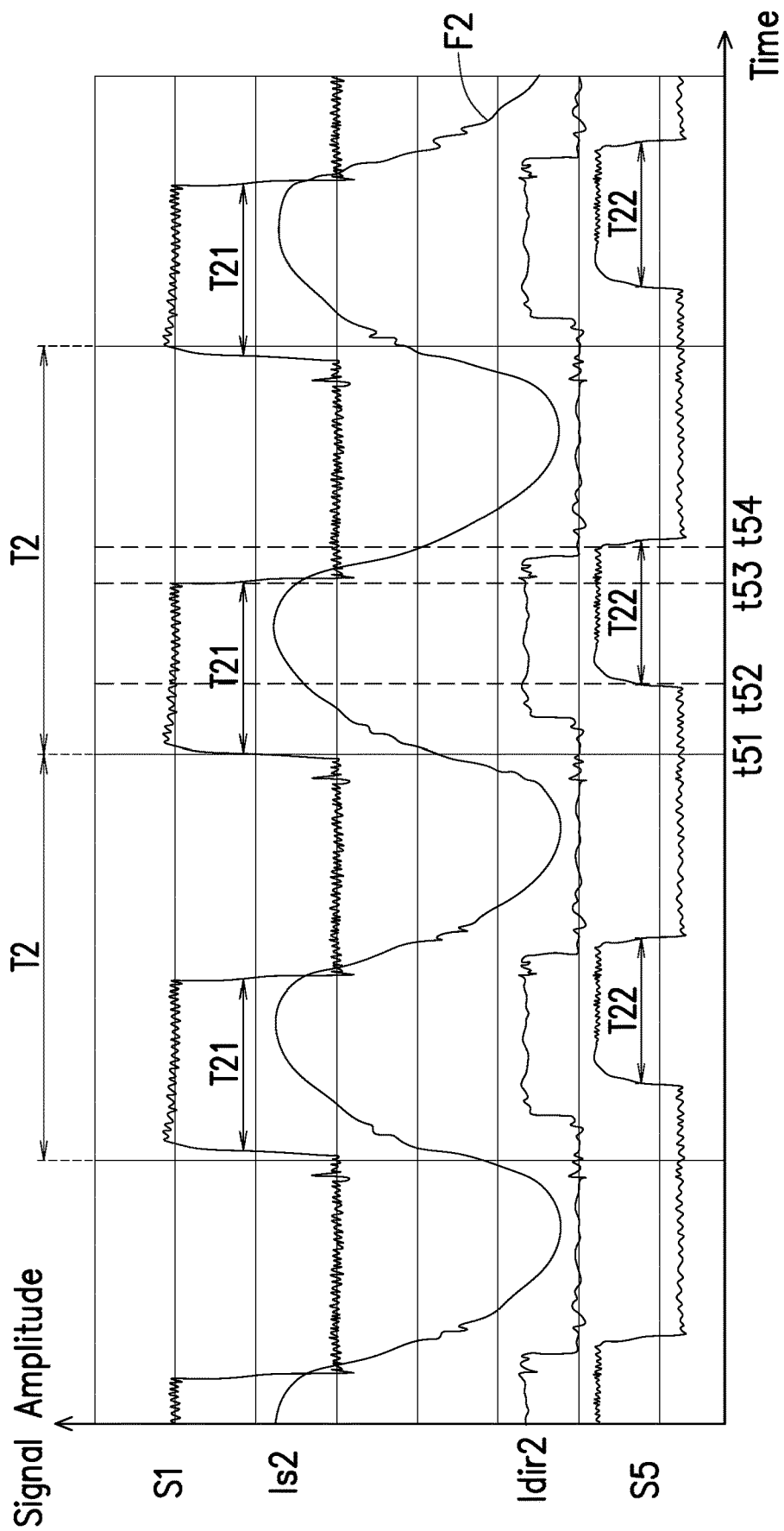
FIG. 5 is a timing diagram illustrating waveforms of signals in the converter operating at a switching frequency higher than a resonant frequency in accordance with some embodiments.

FIG. 5 is a timing diagram illustrating waveforms of the first driving signal S1, the second current Is2, the sensing signal Idir2 and the second driving signal S5 of the converter 100 operating at a switching frequency F2 higher than a resonant frequency of the converter 100 in accordance with some embodiments. The horizontal axis of the diagram in FIG. 5 represents time, and the vertical axis of the diagram in FIG. 5 represents a signal amplitude (i.e., voltage and/or current amplitudes). Referring to FIG. 5, the first driving signal S1 may be a signal which includes a pulse corresponding to a first enabling period T21 in each driving period T2. The second driving signal S5 may be a signal which includes a pulse corresponding to a second enabling period T22. For example, in the driving period T2, the first enabling period T21 of the first driving signal S1 is from t51 (i.e., rising time) to t53 (i.e., falling time). Enabling the first driving signal S1 results in a generation of the second current Is2 and the sensing signal Idir2 on the second side of the transformer. In some embodiments, the second driving signal S5 is generated according to the first driving signal S1 of a same driving period T2, and the second enabling period T22 of the second driving signal S5 is enabled during the same driving period T2. As such, the first enabling period T21 and the second enabling period T22 are in the same driving period T2.

The rising time of the second enabling period T22 of the second driving signal S5 is at t52. The falling time of the second enabling period T22 of the second driving signal S5 is at t54. In some embodiments, at the rising time t52 of the second enabling period T22, the sensing signal Idir2 is greater than a first predetermined threshold (i.e., the first predetermined threshold TH1 in FIG. 2) and the rising time t52 is after the rising time t51 of the first enabling period T21. Since the rising time t51 is prior to the rising time t52, a rising edge of the first driving signal S1 is prior to a rising edge of the second driving signal S5 in the same driving period T2. In some embodiments, at the falling time t54 of the second enabling period T22 of the second driving signal S5, the sensed current Idir2 is less than a second predetermined threshold (i.e., the second predetermined threshold TH2 in FIG. 2). In some embodiments, the second enabling period T22 of the second driving signal S5 is enabled only once in each driving period T2. In FIG. 5, there is only one second enabling period T22 from t52 to t54 in each driving period T2.

In FIG. 4, the falling time t43 of the second enabling period T12 occurs when the sensing signal Idir2 is less than a second predetermined threshold TH2. The falling time t43 of the second enabling period T21 occurs before the falling time t44 of the first enabling period T11. In FIG. 4, since the converter 100 operates at a switching frequency F1 lower than a resonant frequency of the converter 100, the sensing signal Idir2 reaches a value lower than the second predetermined threshold TH2 before the falling time t44 of the first enabling period T11. In FIG. 5, the falling time t54 of the second enabling period T22 occurs when the sensing signal Idir2 is less than a second predetermined threshold TH2. The falling time t54 of the second enabling period T21 occurs after the falling time t53 of the first enabling period T21. In FIG. 5, since the converter 100 operates at a switching frequency F2 higher than a resonant frequency of the converter 100, the sensing signal Idir2 reaches a value lower than the second predetermined threshold TH2 after the falling time t53 of the first enabling period T21. Thus, FIG. 4 and FIG. 5 show that, whether the switching frequency is lower or higher than the resonant frequency of the converter 100, the falling time of the second enabling period occurs when the sensing signal Idir2 reaches a value lower than the second predetermined threshold TH2.

As described above, in some embodiments, in the case wherein when the sensing signal Idir2 reaches a value lower than the second predetermined threshold TH2 before the falling time of the first enabling period, the controller 140 is further configured to disable the second driving signal S5 after determining that the sensing signal Idir2 is less than the second predetermined threshold TH2. In some embodiments, in the case wherein when the sensing signal Idir2 reaches a value lower than the second predetermined threshold TH2 after the falling time of the first enabling period, the controller is further configured to disable the second driving signal S5 after determining that the sensing signal Idir2 is less than the second predetermined threshold TH2.

Referring to FIG. 1, FIG. 4 and FIG. 5, since the first enabling period of the first driving signal S1 and the second enabling period of the second driving signal S5 are enabled during the same driving period, the controller 140 may quickly drive the second switching circuit 121, resulting in improved performance of the converter 100. In addition, the rising time of the second enabling period of the second driving signal S5 is determined according to the first driving signal S1 and a comparison between the sensing signal Idir2 and the first predetermined threshold voltage TH1, the second enabling period of the second driving signal S5 is accurately determined, resulting in an improved performance of the converter 100. Furthermore, since the second enabling period of the second driving signal S5 is enabled only once in each driving period, the determination of the second enabling period of the second driving signal S5 is more accurate.

Figure 6:
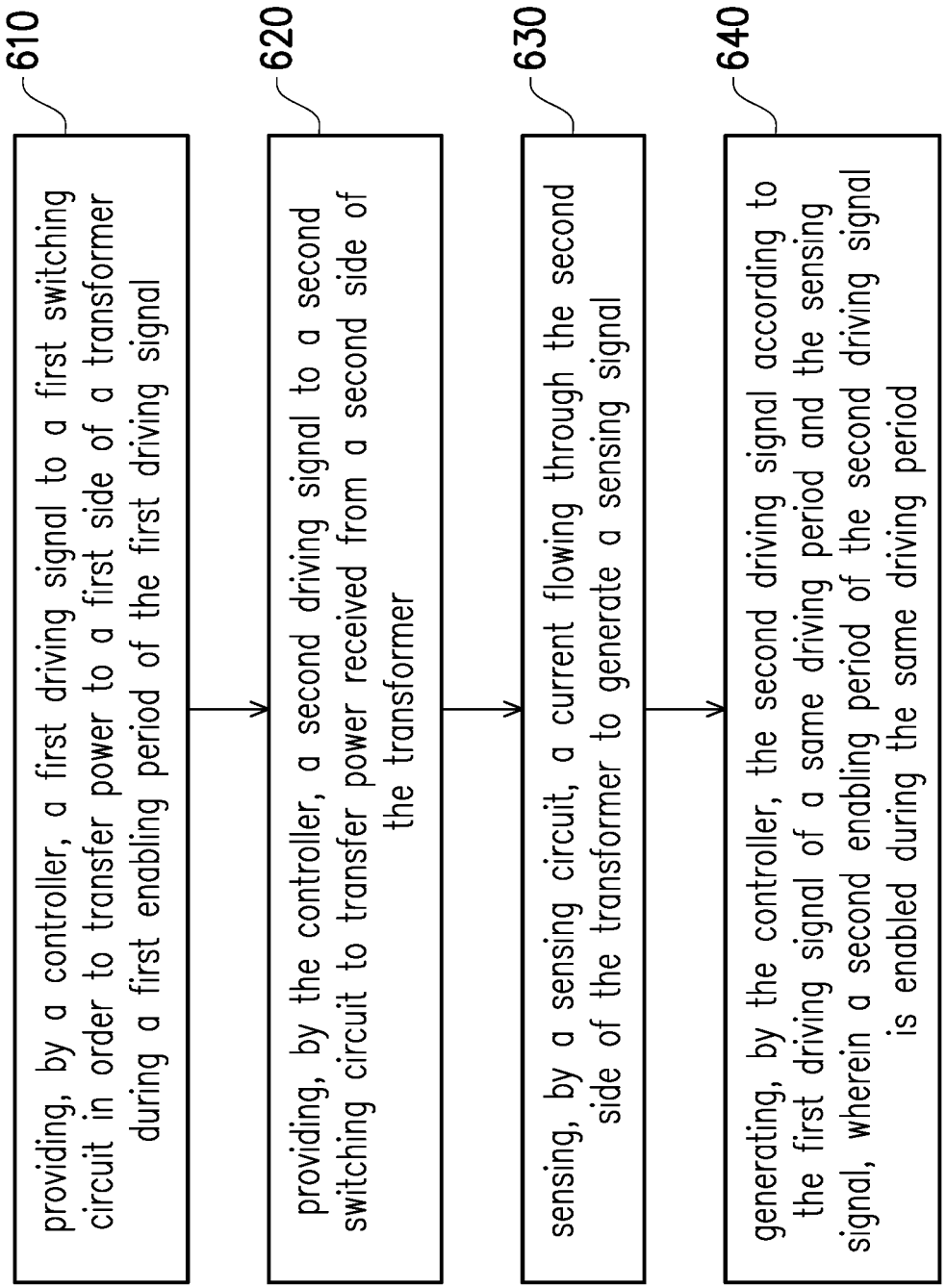
FIG. 6 is a flowchart diagram illustrating a converting method in accordance with some embodiments.

FIG. 6 illustrates a flowchart diagram of a converting method in accordance with some embodiments. In step 610, a first driving signal is provided by a controller to a first switching circuit in order to transfer power to a first side of a transformer during a first enabling period of the first driving signal. In step 620, a second driving signal is provided by the controller to a second switching circuit to transfer power received from a second side of the transformer. In step 630, a current flowing through the second side of the transformer is sensed by a sensing circuit to generate a sensing signal. In step 640, the second driving signal is generated by the controller according to the first driving signal of a same driving period and the sensing signal, wherein a second enabling period of the second driving signal is enabled during the same driving period.

In some embodiments of the disclosure, a controller of a converter may generate a second driving signal for driving a second switching circuit on the second side of the transformer according to the first driving signal of a same driving period. Thus, the converter may quickly respond to the enablement of the first driving signal. In addition, the controller of the converter may enable the second driving signal based on a first enabling period of the first driving signal and a comparison between a sensed current on the second side of the transformer with a first predetermined threshold. Furthermore, the controller may enable the second driving signal only once in each of the driving period. In this way, a second enabling period of the second driving signal is accurately determined, and the performance of the converter is improved.

Although the embodiment of the disclosure has been described in detail, the disclosure is not limited to a specific embodiment and various modifications and changes are possible within the scope of the disclosure disclosed in the claims.

What is claimed is:

1. A converter, comprising:
a transformer, having a first side and a second side;
a first switching circuit, coupled to the first side of the transformer, the first switching circuit being controlled by a first driving signal to transfer power to the transformer during a first enabling period;
a second switching circuit, coupled to the second side of the transformer, the second switching circuit being controlled by a second driving signal to transfer power received from the transformer;
a controller, configured to provide the first driving signal to the first switching circuit, provide the second driving signal to the second switching circuit, generate the second driving signal according to the first driving signal of a same driving period, and enable a second enabling period of the second driving signal during the same driving period; and a sensing circuit, coupled to the transformer and the controller, wherein the sensing circuit is configured to sense a current flowing through the second side of the transformer to generate a sensing signal, wherein the controller is configured to enable the second enabling period of the second driving signal after determining that the sensing signal is greater than a first predetermined threshold, wherein after the controller enables the second enabling period of the second driving signal the controller is further configured to disable the second driving signal after determining that the sensing signal is less than a second predetermined threshold, and the first predetermined threshold is greater than the second predetermined threshold, wherein the controller further comprises a hysteresis comparator, coupled to the sensing circuit, wherein the hysteresis comparator is configured to compare the sensing signal with the first predetermined threshold and generate a first comparison signal and the hysteresis comparator is configured to compare the sensing signal with the second predetermined threshold and generate a second comparison signal, wherein when a rising edge of the first driving signal is detected, the controller enters an initial state and the controller sets the second driving signal to be disabled, in response to determining that the sensing signal is greater than the first predetermined threshold, the controller sets the second driving signal to be enabled, and in response to determining that the sensing signal is less than the second predetermined threshold, the controller sets the second driving signal to be disabled.

2. The converter of claim 1, wherein a rising edge of the first driving signal is prior to a rising edge of the second driving signal in the same driving period.

3. The converter of claim 1, wherein the hysteresis comparator comprises:
a first comparator, configured to receive the sensing signal and the first predetermined threshold, wherein the first comparator generates the first comparison signal when the sensing signal is greater than the first predetermined threshold; and
a second comparator, configured to receive the sensing signal and the second predetermined threshold, wherein the second comparator generates the second comparison signal when the sensing signal is less than the second predetermined threshold.

4. The converter of claim 1, wherein the controller is further configured to enable the second enabling period of the second driving signal merely once in each driving period.

5. The converter of claim 4, wherein the first switching circuit comprises:
a first switch;
a second switch;
a third switch; and
a fourth switch,
wherein a first terminal of the first switch is coupled to a first terminal of the third switch, a second terminal of the first switch is coupled to a first terminal of the second switch, the first terminal of the second switch is further coupled to a first terminal of the first side of the transformer, a second terminal of the third switch is coupled to a first terminal of the fourth switch, the first terminal of the fourth switch is further coupled to a second terminal of the first side of the transformer, and a second terminal of the second switch is coupled to a second terminal of the fourth switch,
wherein the second switching circuit comprises:
a fifth switch;
a sixth switch;
a seventh switch; and
an eighth switch,
wherein a first terminal of the fifth switch is coupled to a first terminal of the seventh switch, a second terminal of the fifth switch is coupled to a first terminal of the sixth switch, a second terminal of the seventh switch is coupled to a first terminal of the second side of the transformer, the first terminal of the sixth switch is coupled to a second terminal of the second side of the transformer, a first terminal of the eighth switch is coupled to the second terminal of the seventh switch, and a second terminal of the sixth switch is coupled to a second terminal of the eighth switch.

6. A converting method, comprising:
providing, by a controller, a first driving signal to a first switching circuit in order to transfer power to a first side of a transformer during a first enabling period of the first driving signal;
providing, by the controller, a second driving signal to a second switching circuit to transfer power received from a second side of the transformer;
generating, by the controller, the second driving signal according to the first driving signal of a same driving period, wherein a second enabling period of the second driving signal is enabled during the same driving period;
sensing, by a sensing circuit, a current flowing through the second side of the transformer to generate a sensing signal, wherein the second enabling period of the second driving signal is enabled after determining that the sensing signal is greater than a first predetermined threshold, wherein after the second enabling period of the second driving signal is enabled, the second driving signal is disabled after determining that the sensing signal is less than a second predetermined threshold, wherein the first predetermined threshold is greater than the second predetermined threshold;
generating a first comparison signal when the sensing signal is greater than the first predetermined threshold;
generating a second comparison signal when the sensing signal is less than the second predetermined threshold;
when a rising edge of the first driving signal is detected, entering an initial state and setting the second driving signal to be disabled;
in response to determining that the sensing signal is greater than the first predetermined threshold, setting the second driving signal to be enabled; and
in response to determining that the sensing signal is less than the second predetermined threshold, setting the second driving signal to be disabled.

7. The converting method of claim 6, wherein a rising edge of the first driving signal is prior to a rising edge of the second driving signal in the same driving period.

8. The converting method of claim 6, wherein the second enabling period of the second driving signal is merely enabled once in each driving period.

* * * * *